United States Patent [19]

Robey

[11] 3,864,300

[45] Feb. 4, 1975

[54] WATER REDUCIBLE COATING COMPOSITIONS AND METHOD FOR PRODUCING THE SAME

[76] Inventor: Luther Clifton Robey, 2755 Brandon Ave., S.W., Roanoke, Va. 24015

[22] Filed: May 24, 1973

[21] Appl. No.: 363,335

Related U.S. Application Data

[63] Continuation-in-part of Ser. No. 288,302, Sept. 12, 1972, abandoned.

[52] U.S. Cl. ......... 260/29.4 UA, 260/850, 260/851, 260/856
[51] Int. Cl............................................ C08g 51/24
[58] Field of Search............ 260/29.4 UA, 850, 851, 260/856

[56] References Cited
UNITED STATES PATENTS

| | | | |
|---|---|---|---|
| 2,852,476 | 9/1958 | Cummings | 260/29.4 UA |
| 2,956,962 | 10/1960 | Wise et al. | 260/29.4 UA |
| 3,044,891 | 7/1962 | Lauchenauer et al. | 260/850 |
| 3,597,496 | 8/1971 | Dagon et al. | 260/851 |

*Primary Examiner*—Lorenzo B. Hayes
*Attorney, Agent, or Firm*—Cushman, Darby & Cushman

[57] ABSTRACT

A water soluble or dispersible coating composition base includes a mixture of a water-soluble or dispersible organic amine neutralized synthetic film-forming resin, a member selected from the group consisting of 4-hydroxy-3-methoxybenzaldehyde and 3,4-dihydroxybenzaldehyde and optionally a pigment. The base is reducible with water as the principal diluent although minor amounts of an organic co-solvent can be employed. The film-forming resin can be the product of an alkyd, acrylic or polyester resin, and aminoplast resin and an amine selected from diethanolamine, dimethylethanolamine or 2-amino-2-methyl-1-propanol. The pigment can be dispersed with agitation at an elevated temperature into the alkyd, acrylic or polyester resin and the remaining components admixed with this dispersion also at said elevated temperature and with agitation.

10 Claims, No Drawings

WATER REDUCIBLE COATING COMPOSITIONS AND METHOD FOR PRODUCING THE SAME

This application is a continuation-in-part of my earlier application Ser. No. 288,302, filed Sept. 12, 1972 now abandoned.

This invention relates to a coating composition base and method for producing the same, said coating composition base comprising a mixture of a water-soluble or dispersible organic amine neutralized synthetic film-forming resin and a member selected from the group consisting of 3,4-dihydroxy-benzaldehyde and 4-hydroxy-3-methoxybenzaldehyde present in amounts effective to essentially eliminate obnoxious odors and the toxic effects of vapors emitted from said composition when heated to an elevated temperature.

The present invention is also related to a coating composition comprising the above coating composition base in an aqueous vehicle and optionally containing a pigment.

The present invention further relates to a method for producing a coating composition comprising a mixture of a water-soluble or dispersible organic amine neutralized synthetic film-forming resin, a member selected from the group consisting of 3,4-dihydroxybenzaldehyde and 4-hydroxy-3-methoxybenzaldehyde and a pigment comprising the steps of heating said film-forming resin to a temperature of about 75°-225°F, admixing said pigment to said heated film-forming resin to disperse the same therethrough and grinding the resulting mixture. The coating compositions of the present invention provide a coating having highly desirable gloss, hardness, adhesion, durability and color characteristics.

Aqueous coating compositions, and particularly water reducible enamels, have been known for some time. These known coating compositions are receiving wide attention at the present since they offer considerable advantages over comparable organic solvent based coating compositions due to the sensitivity of the latter type compositions to variations in temperature, the expense of organic solvents and the relatively greater amounts of toxic and odorous fumes emitted by such compositions in the areas where such compositions are used and especially in the exhaust of ovens where the coating composition is cured on a substrate.

Notwithstanding, it has been recognized that water-soluble or dispersible coating compositions containing organic amine neutralized synthetic film-forming resins which have been employed, for instance, as baking enamels and the like, still exhibit certain serious disadvantages. These known film-forming resin based compositions also emit substantial amounts of toxic fumes when baked or forced dried and most, if not all, fail to meet ever increasingly stringent municipal, state and federal regulations governing the emission of toxic volatiles into the atmosphere.

Further, heretofore known water reducible coating compositions containing pigments are generally of the low solids content type and they usually exhibit poor stability and/or shelf-life or storage characteristics due to undesirable reactions occurring between the pigment content and the water contained in such compositions. These undesirable reactions are most easily apparent when the compositions are stored for periods normally experienced for industrial inventory requirements. The reaction of the pigments with the aqueous vehicle for the composition is generally manifested by discoloration or by an increase in the viscosity of the composition.

It has now been found, however, that by admixing with conventional water-soluble or dispersible organic amine neutralized synthetic film-forming resins, either 3,4-dihydroxybenzaldehyde or 4-hydroxy-3-methoxybenzaldehyde or mixtures thereof, the above disadvantages are overcome. Without being restricted to any particular theory, it is believed that the above benzaldehydes neutralize the amino content of these conventional water-soluble or dispersible organic amine neutralized synthetic film-forming resins thereby essentially preventing their disadvantageous effects on users or those in proximity to the location where they are being used, which effects are generally manifested in coughing and irritation of the eyes, nose, throat and mucous membranes of the user of these known compositions.

Representative conventional water-soluble or dispersible synthetic film-forming resins usefully employed in the present invention are alkyds, polyesters and acrylics, which have been rendered water-soluble or dispersible by neutralization with organic amine resins.

Representative alkyd systems are those based, for instance, on alkyd resins derived from polybasic acids or their anhydrides, polyhydric alcohols and vegetable oils neutralized with organic amine resins such as a urea or triazine, particularly melamine, resin, such as urea formaldehyde, melamine formaldehyde and methoxymethyl melamine. The polybasic acid or anhydride component of these alkyd resins can include, for instance, phthalic anhydride, isophthalic acid, tetrachlorophthalic acid, benzene tricarboxylic acid, succinic acid, adipic acid, maleic acid and fumaric acid. As the polyhydric alcohol there can be used ethylene glycol, diethylene glycol, butanediol, pentenediol, hexanediol, glycerol, trimethylol-ethane, -propane and -butane, pentaerythritol and dipentaerythritol. As the oil component there can be employed, for instance, coconut oil, cottonseed oil, peanut oil, castor oil, ricinic oil, soya oil, linseed oil, tung oil, or mixtures of such oils. Commercially available alkyd resins include those, for instance, sold under the trade name Duraplex and Arolon. For example, Duraplex A-29, which is a 42% (solids basis) soya, 39% (solids basis) phthalic anhydride containing alkyd resin having an acid number of 3-8 (solids basis) and a viscosity Z-6 (Gardner Holdt scale) can be employed, as well as commercially available Duraplex C-45LV, a 60% (solids basis) linseed — 30% (solids basis) phthalic anhydride containing alkyd resin having an acid number of 9-18 and a viscosity of Z-10 (Gardner Holdt scale). yet another commercially available alkyd resin, sold under the Duraplex name, which is usefully employed in the present invention is Duraplex C-45HV, a 53% linseed (solids basis) — 33% (solids basis) phthalic anhydride containing alkyd resin, having an acid number of 5-15 and a viscosity of Z-6 (Gardner Holdt scale). Still another commercially available alkyd resin that can be employed is one sold under the trade name Arolon 376 which is a 37% (solids basis) safflower oil — 42% (solids basis) phthalic anhydride containing alkyd resin having an acid number of 44-48 (solids basis) and a viscosity of 20-30 stokes. It will be noted that, generally, these commercial alkyd resins are in the form of a solution of an organic solvent such as xylol, t-butanol or butoxy ethanol or the like and that prior to use in the present invention such organic solvents are eliminated. The same is true with respect to the use, in the present invention, of any commercially available polyester or acrylic resin.

Representative acrylic resins are those which are thermosetting or thermoplastic including copolymers consisting entirely of poly (methyl methacrylate), copolymers rich in n-butyl methacrylate containing a functional monomer such as methacrylic or acrylic acid or an amide, and relatively low molecular weight copolymers of methyl methacrylate and a functional monomer to provide sites for subsequent crosslinking generally by reaction with non-acrylic components. Representative functional groups utilized in the base resin include carboxyl groups from methacrylic or acrylic acid, hydroxyl groups from hydroxyalkyl methacrylates for crosslinking with for instance urea-formaldehyde or melamine formaldehyde resins and the like. Thus, the basic monomers can include methyl methacrylate, ethyl methacrylate, n-butyl methacrylate, isobutyl methacrylate, lauryl methacrylate, stearyl methacrylate, methyl acrylate, ethyl acrylate, n-butyl acrylate, 2-ethylhexyl acrylate, cyclohexyl methacrylate or 2-ethylhexyl methacrylate while usefully employed functional monomers can include methacrylic acid, acrylic acid, acrylamide, 2-hydroxyethyl methacrylate, 2-hydroxypropyl methacrylate, glycidyl methacrylate, dimethylaminoethyl methacrylate, tert-butylaminoethyl methacrylate, ethylene dimethacrylate, trimethylolpropane trimethacrylate, butylene dimethacrylate and diethylaminoethyl acrylate. Commercially available acrylic resins include those, for instance, sold under the trade name Acryloid B-44 (methyl methacrylate copolymer having a viscosity of 1 cp at 25°C in a 40% solids solution in isopropanol), A-11 or QR 496, an acrylic polymer containing a hydroxyl functional group. Also usefully employed is a thermosetting acrylic resin available commercially under the trade name Arolon 557 which is a styrene modified acrylic ester having a Gardner-Holdt viscosity at 25°C of X-Z+ in a 50% solid solution in isopropanol.

Representative polyester resin systems are those based, for instance, on polyester prepolymers which are condensation products of polycarboxylic acids having about 4-24 carbon atoms, or their anhydrides, and polyhydric alcohols, having about 2-12 carbon atoms. Representative polycarboxylic acids include, for instance, trimellitic acid, phthalic acid, adipic acid, azelaic acid, maleic acid, adducts of maleic acid with fatty oils or fatty acids such as maleinized soybean oil, maleinized tall oil acids and the like. Representative polyhydric alcohols include, for instance, neopentyl glycol, trimethylol propane, trimethylol ethane, 1,3-butane diol, glycerol, pentaerythritol and the like. Commercially available polyester resins include those, for instance, sold under the trade name Arolon 465 (an oil-free alkyd or saturated polyester having an acid value of 50-90) at 80% solids in ethylene glycol monobutyl ether and a viscosity of 20-30 stokes or a Gardner Holdt value of Y-Z, at 20% solids in butoxy ethanol at 25°C; Paraplex RG2 a partially saturated polyester having an acid number (100% solids) of 22-35, a saturated polyester having an acid number of 10-20 (100% solids), a partially saturated polyester having an acid number of 47-60 (100% solids) and a saturated polyester having an acid number of 42-88, available under the designation 720-28 by the Cargil Company.

The above alkyd, acrylic and polyester resins are combined with an amino resin such as a water-soluble aminoplast including urea and/or melamine- and/or guanamine formaldehyde resins and methoxymethylol melamine. Other aminoplasts usefully employed include those derived from the reaction of melamine or urea with formaldehyde and an alcohol such as n-butanol, isobutanol or methanol. Amino resins in general and water-soluble amino resins in particular are discussed in: Polymer Processes, Schildknect (High Polymers, vol. X) chapter VIII, "Condensations with Formaldehyde," Interscience Publishers, 1956, and in Amino Resins, Blais, Reinhold, 1959. Commercially available amino resins usefully employed in the present invention include those sold under the trade names Uformite MM 83, Cymel 303 and Resimene X-712, X-714, X-745, X-746 and X-730. Generally the ratio (parts by weight) aminoplast resin employed to said alkyd, acrylic or polyester resin ranges between about 1-50:99-50, preferably 18-30:82-70.

The amino resin modified alkyd, acrylic or polyester resin is neutralized with an amine selected from the group consisting of diethanol amine, dimethylethanol amine and 2-amino-2-methyl-1-propanol, the latter being preferred and the amount of said amine utilized being that sufficient so that the resulting water-soluble or dispersible organic amine neutralized synthetic film-forming resin has a solids content of 94-96% and when employed in the coating composition of this invention, said composition has a pH of about 7.5-12.0. The composition, however, can be adjusted to the desired pH value by the inclusion of additional amounts of the above identified amine component.

The coating composition of the present invention i.e. a mixture of the above defined water-soluble or dispersible organic amine neutralized synthetic film-forming resin and a member selected from the group consisting of 3,4-dihydroxy-benzaldehyde and 4-hydroxy-3-methoxy benzaldehyde has a solids content ranging from about 5 to 98%, preferably about 30 to 50%.

This coating composition base can, in another embodiment of the present invention, be admixed with conventional pigments including those which heretofore have been considered water sensitive to provide a composition which when diluted with water exhibits the surprising advantage of essentially not undergoing undesirable reactions during conventional formulation and application periods between the water and the pigment component. Representative conventional colors or pigments usefully employed in the present invention include zinc white, zinc oxide, lead white, lead cyanamide, red lead oxide, titanium dioxides, iron oxides, chromium oxides, chrome green, chrome yellow, molybdate orange, Bubine red, phthalocyanine blue and green, hansa yellow, toluidine red, lake reds and maroons, carbon and bone black and others, as well as desired mixtures thereof. Generally, the color or pigment will be present in amounts of about 0.2 to 75.0 percent by weight of the total composition. In this embodiment of the present invention, the pigment is admixed with the alkyd, acrylic or polyester resin based film-forming resin, generally at a 98 to 100% solids content by heating the same to a temperature of 75°-225°F, and dispersing said pigment into said resin. For this purpose there is employed a suitable container or vessel, equipped with a heating unit such as a belt or bottom type or other suitable explosion proof type unit which is capable of raising the temperature of the grind portion of the resin to a viscosity suitable for the dispersion therein of the selected pigment. The container is generally provided with a suitable stirrer or disperser for admixing the resin and the pigment, which admixture can subsequently be subjected to a further grinding operation in a conventional sand or roll grind mill or a pebble or steel ball grind mill. It will be recognized, of course, that any other conventional apparatus can be employed to disperse the pigment into the resin. During the dispersion stage, the above defined amine component can also be added and the mixture of resin, pigment and amine component is dispersed, usually, to a grind of 2 to 5 on the Hegman grind gauge. Subsequent to the dispersion stage, as indicated above, the resulting dispersion can be introduced into a conventional grind mill together with the above-identified amino resin and said member selected from the group consisting of 3,4-dihydroxybenzaldehyde and 4-hydroxy-3-methoxy benzaldehyde and ground to a Hegman grind gauge of 7 to 7+ off scale. During this latter grinding operation, if desired, additional amounts of the above defined amine component can be added to adjust the resulting pH to one in the range of 7.5 to 12.0.

The resulting composition base is, of course, prior to use, dilutable with water to any solids content desired. Generally it has been found convenient to ship and/or store the composition in the form of a high solids content composition generally in the range of about 80% solids or greater. However, in addition to water, as the principal diluent, there can be used minor amounts of an auxiliary diluent such as diethylene glycol monomethyl ether, ethylene glycol monoethyl ether acetate, tertiary butyl alcohol or isopropyl alcohol. The amount of auxiliary diluent utilized, however, does not exceed that permissible by existing governmental regulations relating to air quality emissions and health controls. It has been found advantageous to heat the principal diluent, i.e. water, to a temperature of about 100°–150°F just before admixing it with the coating composition base of this invention, especially when the latter is in paste form.

Thus, the coating composition of the present invention comprises an aqueous solution or dispersion of a water-soluble dispersible organic amine neutralized synthetic film-forming resin present in amounts such that the solids content therein ranges from about 5–98%, ± 2%, and 0.5 to 5.0 weight percent of a member selected from the group consisting of 3,4-dihydroxybenzaldehyde and 4-hydroxy-3-methoxybenzaldehyde.

The water-soluble dispersible organic amine neutralized synthetic film-forming resin comprises the reaction of (A) 5.0 to 85.0 weight percent of a member selected from the group consisting of an alkyd, acrylic or polyester resin with (B) 80.0 to 5.0 weight percent an aminoplast resin and (C) 1.0 to 15.0 weight percent an amine component selected from the group consisting of diethanolamine, dimethylethanol amine and 2-amino-2-methyl-1-propanol.

The following examples are given for the purpose of illustrating the present invention, the parts being parts by weight, unless otherwise stated.

EXAMPLE 1

Into a suitable container there is introduced 77 parts by weight of acrylic resin sold under the trade name Arolon 557-D-70, from which the commercial solvent had previously been removed, which is heated, with agitation, to a temperature of about 180°F, to which is added 1.75 parts by weight of an amine component selected from diethanolamine, dimethylethanolamine or 2-amino-2-methyl-1-propanol. Mixing is continued and the pH thereof is measured with a standard pH meter as pH 8. The speed of agitation is increased to approximately 4,000 rpm, at which point there are slowly added 25 parts by weight of rutile titanium dioxide ($TiO_2$). The mixture is ground to a Hegman grind gauge of 4.5 to 5.0, after which the resulting ground mixture is introduced in to a sand grind mill and further ground to a Hegman grind gauge of 7+. The thus ground mixture is transferred to another container, equipped with a high speed mixture, in motion, and to which is slowly added, with agitation, 20 parts by weight of methoxymelamine (99.5–100% solids) and 1 part by weight of 4-hydroxy-3-methoxybenzaldehyde. Agitation is continued until the components are thoroughly mixed at which point the pH of the resulting mixture is adjusted to a value of 8.5 by the further addition thereto of 2-amino-2-methyl-1-propanol, with agitation. The resulting composition, having a paste-like consistency, can be packaged in metal containers and shipped to any desired destination. At the point of destination the same can, if desired, be placed in a heating room or on a strap-belt heater to raise the temperature thereof, thereby facilitating its admixture (i.e. dilution) with water, to any desired solids content. Optionally any of the above-mentioned auxiliary organic solvents can also be introduced as long as the amount employed does not violate existing municipal, state or federal regulations. Further, if desired, 2-amino-2-methyl-1-propanol in amounts of about 0.5–1.0 part by weight can be added during this diluting stage which provides easier reduction with water, the latter being, as indicated above, warmed to a temperature of about 100°–150°F to facilitate its acceptance by the foregoing described paste.

EXAMPLE 2

The procedure set forth in Example 1 is repeated except that there is utilized 20 parts by weight methoxymethyl melamine, 80 parts by weight of acrylic resin, 1.7 parts by weight of 2-amino-2-methyl-1-propanol and 1 part by weight of 4-hydroxy-3-methoxybenzaldehyde. No pigment was employed in this example, thereby providing a clear composition which remains stable for extended periods of time.

EXAMPLE 3

Example 1 is repeated except that there is employed 18 parts by weight of methoxymethyl melamine, 82 parts by weight of acrylic resin and 25 parts by weight $TiO_2$, the other components being used essentially in the same amounts as that given in Example 1. The resulting paste-like composition was reduced or diluted to a total solids content of 65% by the addition thereto of 18.0 parts by weight diethylene glycol monoethyl ether and 82.0 parts by weight water. The resulting composition was drawn down on 0.024 aluminum, baked for 1 minute at 500°F and cold water quenced.

The resulting film exhibited high gloss, good salt fog resistance, good adhesion that tolerates mild post forming and excellent exterior durability characteristics.

The same resulting composition was drawn down and baked for 30 minutes at 350°F and the resulting film exhibited essentially the same favorable characteristics.

EXAMPLE 4

Example 1 is repeated except that there is employed 30 parts by weight of methoxy melamine and 70 parts by weight of acrylic resin. The resulting composition, reduced to 65% solids by the addition thereto of water, was baked on 0.024 gauge aluminum for 1 minute at 500°F, cold water quenched, baked an additional 30 minutes at 350°F and again cold water quenched. The resulting film exhibited a gloss higher than that achieved in Example 1, but was much harder and less flexible.

EXAMPLE 5

The procedures of Example 1 were repeated except that essentially comparable amounts of alkyd resin sold under the trade name Duraplex C-45-LV-100%, from which the commercial solvent had been previously removed, were employed rather than the acrylic resin. Equally favorable results were achived.

EXAMPLE 6

The procedures of Example 1 were repeated except that essentially comparable amounts of polyester resin sold under the trade name Arolon A-465-100% 10/10, from which the commercial solvent had been previously removed, were employed rather than the acrylic resin. Equally favorable results were achieved.

EXAMPLES 7 - 9

Examples 1, 5 and 6 are repeated except that essentially comparable amounts of urea-formaldehyde resin are employed for methoxy melamine. Equally favorable results are achieved.

EXAMPLES 10 - 12

Examples 1, 5 and 6 are repeated except that the 4-hydroxy-3-methoxybenzaldehyde is replaced by essentially equivalent amounts of 3,4-dihydroxybenzaldehyde. Equally favorable results are achieved.

EXAMPLES 13 - 15

Examples 2, 5 and 6 are repeated except that the 2-amino-2-methyl-1-propanol is replaced by essentially equivalent amounts of diethanolamine.

EXAMPLES 16 - 18

Examples 2, 5 and 6 are repeated except that the 2-amino-2-methyl-1-propanol is replaced by essentially equivalent amounts of dimethylethanolamine.

The compositions of the present invention can be provided in the form of a powder, paste, syrup or aqueous solution of any desired solids content and can be employed for automobile coatings, refrigerator coatings, for other appliances such as freeze units, water heaters, cabinets, desks, display racks, gas pumps, air conditioners, humidifiers, industrial metal sidings, industrial extrusions, residential sidings and extrusions, hospital furniture and equipment, metal furniture for ships, metal office equipment and exterior coatings for metal cans. Further the compositions can, as indicated above, be reduced with water to a desired viscosity such that it can be applied to a substrate by conventional methods including roll coating, airless or air spray techniques, dip coating, curtain coating, offset rotogravure coating or electrostatic spray coating procedures although it is to be understood that the present invention makes no claim to the method of application known as electrodeposition where the article is immersed into an electrically charged tank. Various substrates to which the coating composition of this invention can be applied include those of steel and its alloys, aluminum and its alloys, and brass.

What is claimed is:

1. A water-soluble or dispersible coating composition base consisting essentially of a mixture of (1) a water-soluble or dispersible organic amine neutralized synthetic film-forming resin and (2) an aldehyde selected from the group consisting of 3,4-dihydroxybenzaldehyde and 4-hydroxy-3-methoxybenzaldehyde, said synthetic film-forming resin comprising a combination of (i) a member selected from the group consisting of an oil modified alkyd resin, an acrylic resin and a polyester resin and (ii) an aminoplast resin, the parts by weight ratio of aminoplast resin to said member being about 1–50:99–50, said aldehyde being present in amounts effective to essentially eliminate obnoxious odors and toxic effects of vapors emitted by said composition when heated.

2. The coating composition of claim 1 wherein said amine is selected from the group consisting of diethanolamine, dimethylethanolamine and 2-amino-2-methyl-1-propanol.

3. The coating composition of claim 1 which also includes a pigment in amounts of about 0.2–75 percent by weight of the composition.

4. A coating composition consisting essentially of an aqueous solution or dispersion of a water-soluble or dispersible organic amine neutralized synthetic film-forming resin and an aldehyde selected from the group consisting of 3,4-dihydroxybenzaldehyde and 4-hydroxy-3-methoxybenzaldehyde, said synthetic film-forming resin comprising a combination of (i) a member selected from the group consisting of an oil-modified alkyd resin, an acrylic resin and a polyester resin and (ii) an aminoplast resin, the parts by weight ratio of aminoplast resin to said member being about 1–50:99–50, said film forming resin being present in amounts such that said composition has a solids content ranging from about 5–98 percent and said aldehyde being present in amounts of about 0.5–5 percent by weight of said composition.

5. The coating composition of claim 4 which also includes a pigment in amounts of about 0.2–75 percent by weight of said composition.

6. The coating composition of claim 4 wherein said amine is selected from the group consisting of diethanolamine, dimethylethanolamine and 2-amino-2-methyl-1-propanol and is present in amounts such that the pH of the composition is about 7.5–12.0.

7. The coating composition of claim 4 which also includes minor amounts of an organic co-solvent.

8. A process for producing a water-soluble or dispersible coating composition base comprising a mixture of (1) a water-soluble or dispersible organic amine neutralized synthetic film-forming resin, said synthetic film-forming resin comprising a combination of (i) a member selected from the group consisting of an oil-modified alkyd resin, an acrylic resin and a polyester resin, (ii) an aminoplast resin, the parts by weight ratio of aminoplast resin to said member being about 1-50:99-50, and (iii) an amine selected from the group consisting of diethanolamine, dimethylethanolamine and 2-amino-2-methyl-1-propanol present in amounts to neutralize said film-forming resin, and (2) an aldehyde selected from the group consisting of 3,4-dihydroxybenzaldehyde and 4-hydroxy-3-methoxybenzaldehyde present in amounts effective to essentially eliminate obnoxious odors and toxic effects of vapors emitted by said composition when heated and (3) a pigment present in amounts of 0.2-75 percent by weight of said composition comprising heating said composition to a temperature of 75°-225°F with agitation to thoroughly disperse said pigment therethrough.

9. The process of claim 8 wherein said process includes heating member (i) to a temperature of 75°-225°F with agitation, admixing said amine (iii) with said member (i) at said temperature and with agitation, admixing said pigment with the resulting mixture of said member (i) and said amine (iii) and dispersing said pigment therethrough and admixing said aminoplast resin (ii) and said aldehyde with agitation and at said temperature to the resulting mixture of said member (i), said amine (iii) and said pigment.

10. The process of claim 9 which includes adjusting said composition to a pH of about 7.5-12.0.

* * * * *